(12) United States Patent
Edmunds

(10) Patent No.: US 9,021,346 B2
(45) Date of Patent: Apr. 28, 2015

(54) SYSTEMS AND METHODS FOR DISPLAYING AND EDITING STATE-SPECIFIC LINK ATTRIBUTES

(75) Inventor: Randall Edmunds, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 636 days.

(21) Appl. No.: 12/634,348

(22) Filed: Dec. 9, 2009

(65) Prior Publication Data

US 2013/0198597 A1      Aug. 1, 2013

(51) Int. Cl.
  *G06F 17/00*      (2006.01)
  *G06F 17/21*      (2006.01)
  *G06F 17/20*      (2006.01)

(52) U.S. Cl.
  CPC .............. *G06F 17/21* (2013.01); *G06F 17/20* (2013.01)

(58) Field of Classification Search
  CPC .................. G06F 17/2247; G06F 17/3089
  USPC ........... 715/206, 207, 208; 717/110, 124, 125
  See application file for complete search history.

(56) References Cited

U.S. PATENT DOCUMENTS

| | | | | |
|---|---|---|---|---|
| 7,769,773 | B1* | 8/2010 | Doubek et al. | 707/769 |
| 2006/0174195 | A1* | 8/2006 | White | 715/522 |
| 2008/0178122 | A1 | 7/2008 | Besecker | |
| 2009/0031225 | A1 | 1/2009 | Toebes et al. | |
| 2009/0150793 | A1* | 6/2009 | Xing et al. | 715/740 |
| 2011/0072338 | A1* | 3/2011 | Caldwell | 715/205 |
| 2011/0191668 | A1* | 8/2011 | Kelkar et al. | 715/235 |
| 2013/0227396 | A1* | 8/2013 | Chinnathambi et al. | 715/235 |

OTHER PUBLICATIONS

UsibilityPost, 'Pressed Button State with CSS', Dec. 16, 2008 http://www.usabilitypost.com/2008/12/16/pressed-button-state-with-css/.*
Tizag.com, 'CSS Links Pseudo Classes', Erack Network, Copyright 2008, http://www.tizag.com/cssT/pclass.php.*
Henry Bojack, 'New Perspectives Microsoft Expression Web', Copyright 2009, pp. 283 & 286.*
Gavin Wignall, 'Creating Buttons and Using States in Blend', Silverlight Buzz, Published Oct. 21, 2009.*
"Upcoming release of the new CoffeeCup HTML Editor/CoffeeCup Software," http://www.coffeecup.com/forums/html-editor/upcoming-release-of-the-new-coffeecup-html-edito . . . downloaded from the Internet on Nov. 5, 2009.

* cited by examiner

*Primary Examiner* — Stephen Hong
*Assistant Examiner* — Matthew Ludwig
(74) *Attorney, Agent, or Firm* — Kilpatrick Townsend & Stockton LLP

(57) ABSTRACT

Systems and methods for displaying and editing state-specific link attributes during the development of electronic content. The states of HTML links, which can be defined by CSS pseudo classes, can be displayed and edited using visual interface features of a content creation application. Such features can provide convenient ways to view multiple links simultaneously in a selected state and to edit the appearance of a state that is applicable to multiple links used in a piece of content being developed. The user interface of a content creation application can provide a button, command, or other user-selectable option that sets the state in which link representations are displayed. This can be achieved, as an example, in the case of HTML links defined by CSS pseudo classes, by filtering links based on state so that all displayed links display in the selected state, e.g., in the :link, :visited, :hover, :active, or :focus state.

22 Claims, 6 Drawing Sheets

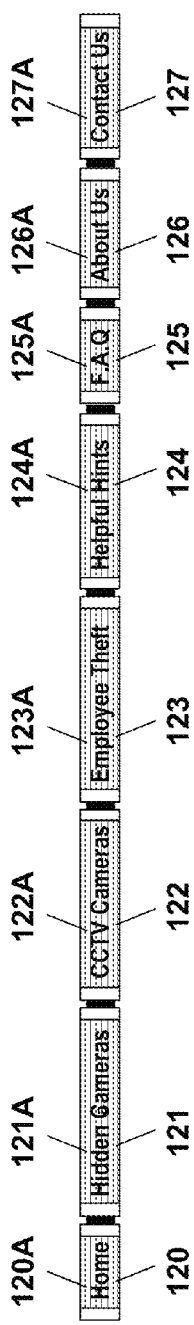
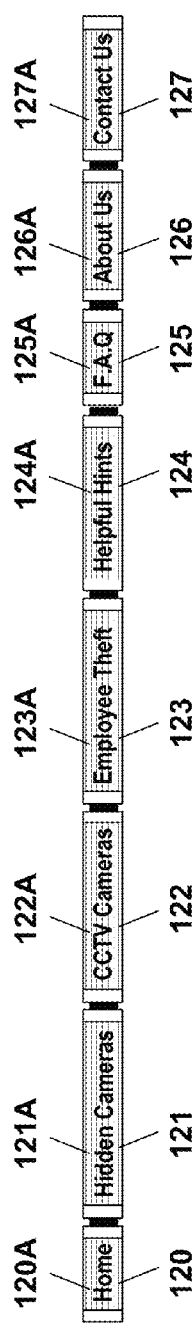
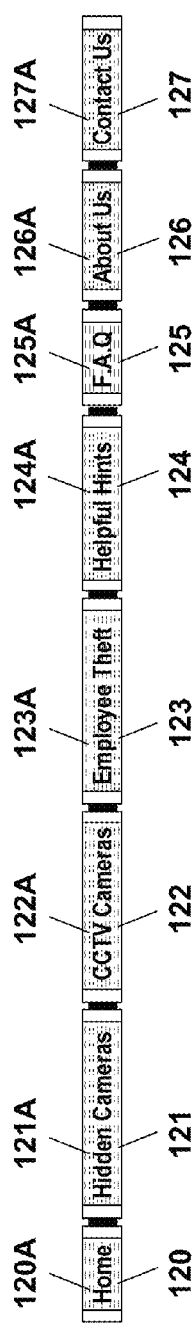
FIGURE 3A
FIGURE 3B
FIGURE 3C

SYSTEMS AND METHODS FOR DISPLAYING AND EDITING STATE-SPECIFIC LINK ATTRIBUTES

FIELD

This disclosure relates generally to computer software that runs, displays, provides, or otherwise uses electronic content.

BACKGROUND

There are various applications used to create and edit web pages and other web content. Such applications often provide various visual tools and features that facilitate content creation. Visual representations of web page objects are often displayed to allow the creator to visualize how objects will be displayed in the resulting web content and, in some circumstances, edit the resulting web content by editing those visually-displayed representations.

The appearance of web content objects can be specified in various ways including through the use of cascading style sheets (CSS). Web content creation applications can facilitate the editing of both web object specific appearance attributes and attributes defined using CSS. For example, a content creator may select a paragraph object representation displayed on an editing canvas area and then use CSS style panels, property inspectors, and/or various other tools to edit the CSS styles that apply generally to paragraph type objects.

Web pages and other content often include hyperlinks that are distinguishable from ordinary text. A "link" generally refers to a hyperlink including any text or other object that when selected results in a navigation or other change in the displayed web page or content. There are various benefits to displaying links in different ways depending upon the "states" of the links. For example, a web page creator may desire that a link display differently when the user hovers over the link with the selection cursor. Similarly, it may be desirable to display a link differently after it has been used. Exemplary link states include link state, visited state, hovered state, active state and focus state. A web page or other content may include multiple links and the individual states of the different links may differ.

In editing an HTML page with CSS, pseudo classes can be used to define the states of links and thus the different appearances for a link in different states. Generally, in defining pseudo classes for links in web creation applications, links are statically displayed, i.e., in a single state, such as the link state. Since there is generally no active page behavior while editing in a web page development application, the appearance of a link in other states is not visually shown or editable on the design view. Web creators must instead use a code view or other non-visual tools to manually edit the other pseudo classes, for example, by directly editing CSS text.

SUMMARY

Systems and methods are disclosed for displaying and editing state-specific link attributes in electronic content being created. For example, a web content development application may provide features that facilitate visual editing of the states of Hyper Text Markup Language (HTML) links as defined by CSS pseudo-classes. One exemplary feature displays many or all links in the content being developed in a same state so that, for example, all links can be viewed in their respective "hover" states at the same time during development. Another exemplary feature allows a content editor or other user to choose a state in which one or more of the displayed link representations in the development application will be displayed. As a specific example, a user may identify a particular pseudo class that defines a particular state and, in response, the development application may display all of the content's links on its canvas editing area in that user-identified state. Various features facilitate the visual editing of pseudo class styles, for example, by interacting with displayed representations of the link in the to-be-edited state. In certain embodiments, link editing is facilitated using an interface that presents editable link representations within an editing area that also displays other visual elements of the web content being developed. Thus, link editing can occur through interaction with link representations displayed in the actual context in which such links will appear in the web content.

One exemplary embodiment comprises a method in the context of a content creation application. For example, instructions embodied in a computer-readable medium on a computer apparatus may be used to configure the computer apparatus to provide a content creation application that displays a display area with content in development that is editable using editing features of the content creation application and that includes at least one link having different states. During use of the content, i.e., an end user using HTML content using a web browser, an appearance of the link depends at least in part on which of the states are applicable to the link. And, which of the states are applicable to the link is based at least in part on use of the content. For example, once an HTML end user has clicked on a link, the visited state may subsequently be applicable to that link An exemplary method involves receiving, in the content creation application, a selection identifying a selected state and displaying the link in the content as the link will appear during use of the content when the selected state is applicable. In other words, the link appears in the development environment in the selected state. The content creator can the see and/or edit the appearance of the individual links, the appearance of classes defining the appearance of multiple links and components, and interact with the content creation application in various ways to complete the content that is being developed. Ultimately, the content can be provided for use by end users, for example, by publishing the content or saving it to a location accessible for such use.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIGS. 3A-C are portions of computer screen captures illustrating a different state-specific link attributes in the content creation application of FIG. 2;

DETAILED DESCRIPTION

Certain embodiments are systems and methods for displaying and editing state-specific link attributes in electronic content being created. The states of HTML links, which can be defined by CSS pseudo classes, can be displayed and edited using the visual interface features of a content creation application. Features can provide convenient ways to view multiple links simultaneously in a selected state and to edit the appearance of a state that is applicable to multiple links used in a piece of content being developed.

In one embodiment, the user interface of a content creation application provides a button, command, or other user-selectable option that sets the state in which link representations are displayed. This can be achieved, as an example, in the case of HTML links defined by CSS pseudo classes, by filtering links based on state so that all displayed links display in the selected state, e.g., in the :link, :visited, :hover, :active, or :focus state.

Link representations can be presented in a content creation application in a variety of ways. For example, a content creation application may provide a canvas, stage, or other display area that provides What-You-See-is-What-You-Get graphical representations of elements used in content being developed and allows a user to edit the content being developed by interacting with such elements directly and using other features provided by the content creation application. Upon selection of a link filter option, the display area changes and all the links change to show how they would appear in the selected state. As a specific example, a content creator may select a link filter option, select an icon associated with the :visited state, and observe that all of the links displayed are shown in the visited state. Such a developer may then use an editing feature, such as a property inspector, to change the state-specific appearance associated with one or more of those links. Thus, changing an attribute can change how the visited state (e.g., how the visited pseudo class is defined) for one or more of the links.

These illustrative examples are given to introduce the reader to the general subject matter discussed here and are not intended to limit the scope of the disclosed concepts. The following sections describe various additional embodiments and examples with reference to the drawings in which like numerals indicate like elements.

Illustrative System Implementation

Figure 1:
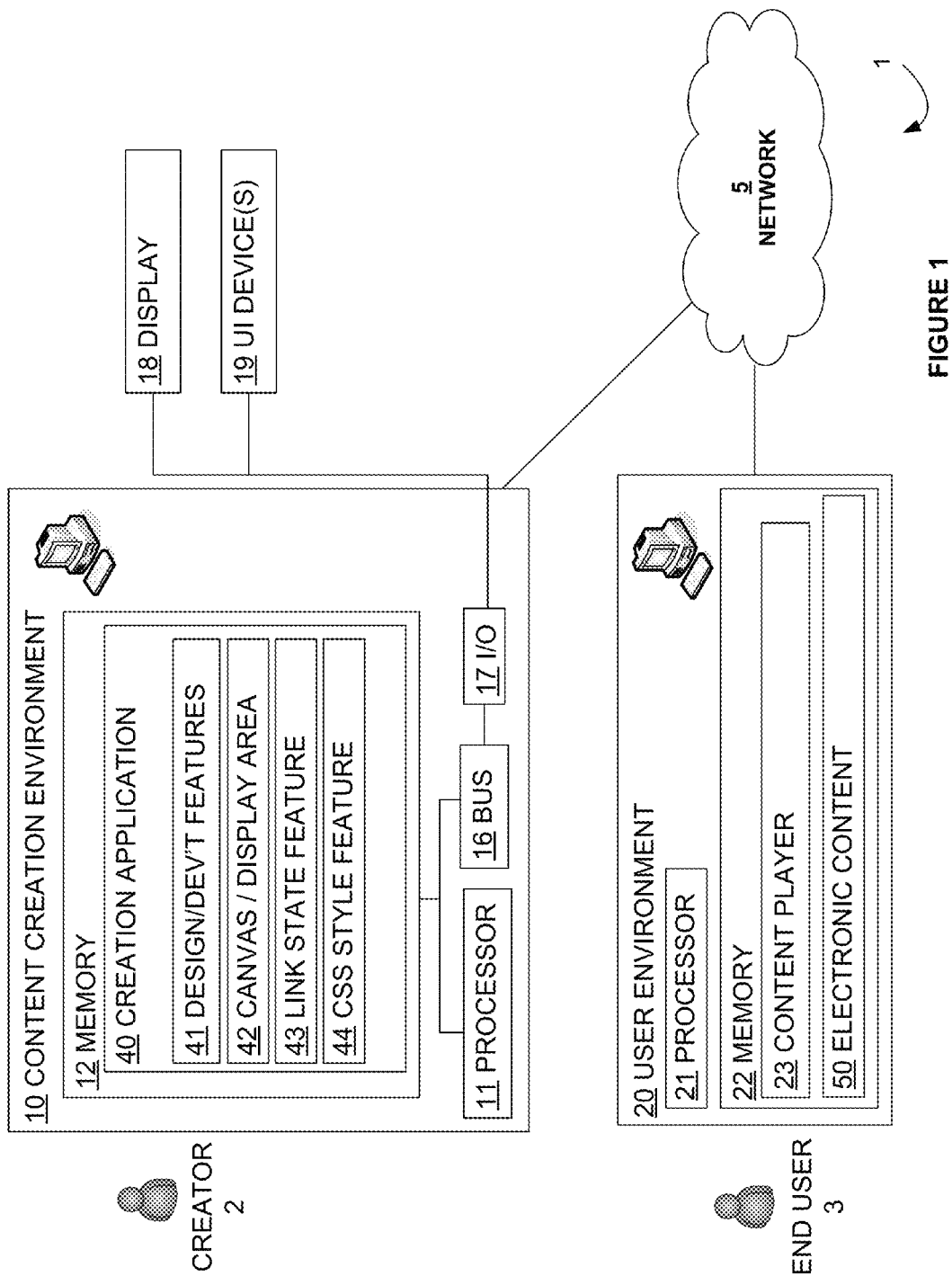
FIG. 1 is a block diagram of a system that provides a content creation application capable of displaying and editing state-specific link attributes according to one embodiment.

Referring now to the drawings in which like numerals indicate like elements throughout the several Figures, FIG. 1 depicts a system that provides a content creation application capable of displaying and editing state-specific link attributes according to certain embodiments. Other computing systems and environments may be also be used. The environment 1 shown in FIG. 1 comprises a wired or wireless network 5 connecting various network devices 10, 20. Exemplary applications that execute on each of the devices 10, 20 are shown as functional or storage components residing in memory 12, 22 on the respective devices. The memory 12, 22 may be transient or persistent. As is known to one of skill in the art, such applications may be resident in any suitable computer-readable medium and execute on any suitable processor. For example, the network devices 10, 20 shown each may comprise a computer-readable medium such as a random access memory (RAM) 12, 22 coupled to a processor 11, 21 that executes computer-executable program instructions and/or accesses information stored in memory 12, 22. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 5 shown comprises the Internet. In other embodiments, other networks, intranets, combinations of networks, or no network may be used. The devices 10, 20 can be connected to a network 5 as shown. Alternative configurations are of course possible. The devices 10, 20 may also comprise a number of external or internal devices such as a mouse, a CD-ROM, DVD, a keyboard, a display, audio speakers, or other input or output devices. For example, content creation environment 10 includes a display 18 and various user interface devices 19. A bus, such as bus 16, will typically be included in each of the computing devices 10, 20.

Content creation environment 10 includes a content creation application 40 for a creator 2 to create and edit electronic content. The creation application 40 may include various design and development features 41, a canvas or display area 42, a timeline tool 43, and a library 44. A creator 2 may position various graphically-displayed objects on the canvas or display area 42 to specify the appearance of the application or other content that is being created. The design and development features 41 may be used to edit and configure these graphically-displayed objects and to add functionality, animation, and event-based interactivity to those objects. As one example, a link state feature 43 is provided that allows a content creator to specify a particular state in which all of the links on the canvas/display area 42 will be displayed in. As another example, a CSS style feature 44 provides an interface through which a content creator can specify CSS attributes used by the content displayed on the canvas/display area.

The content creation environment 10 can generally be used to create electronic content 50 that is provided for use by end users, for example, by end user 3 using content player 23 of user environment 20. Such electronic content may be provided to the end user 3 through network 5 or in any other suitable manner.

This exemplary system configuration is provided merely to illustrate a potential configuration that can be used to implement certain embodiments. Other configurations may of course be utilized.

Exemplary Methods of Displaying and Editing State-Specific Link Attributes

A content creation application may provide a display area that displays one or more graphical elements of content being created including one or more links. The application may provide various features for displaying and editing state-specific attributes of multiple links simultaneously. Accordingly, a web page or other content being developed may be displayed in the display area in one or more ways that facilitate creation and editing of links. Such content is not necessarily displayed in a way that would be seen in a browser or other content viewer, but in ways that are useful for creation and editing purposes. For example, the application may display all links in the :hover state even though it may be impossible for an end user using the created content to hover more than one link at a time. However, displaying all of the links in the :hover state simultaneously during development can, among other things, facilitate editing multiple elements at once and help ensure a consistent appearance amongst multiple links. It may also be easier to test links in the development environment using such a feature since the developer will not need to manually hover over each link individually to test it.

Various features can also facilitate testing the initial state, i.e., the :link state, of links which can be otherwise difficult to test. For example, once a link is clicked for testing purposes it may difficult or cumbersome for developers to later test the initial states of the links since information may be cached that causes the link to continue to be shown as visited.

Figure 2:
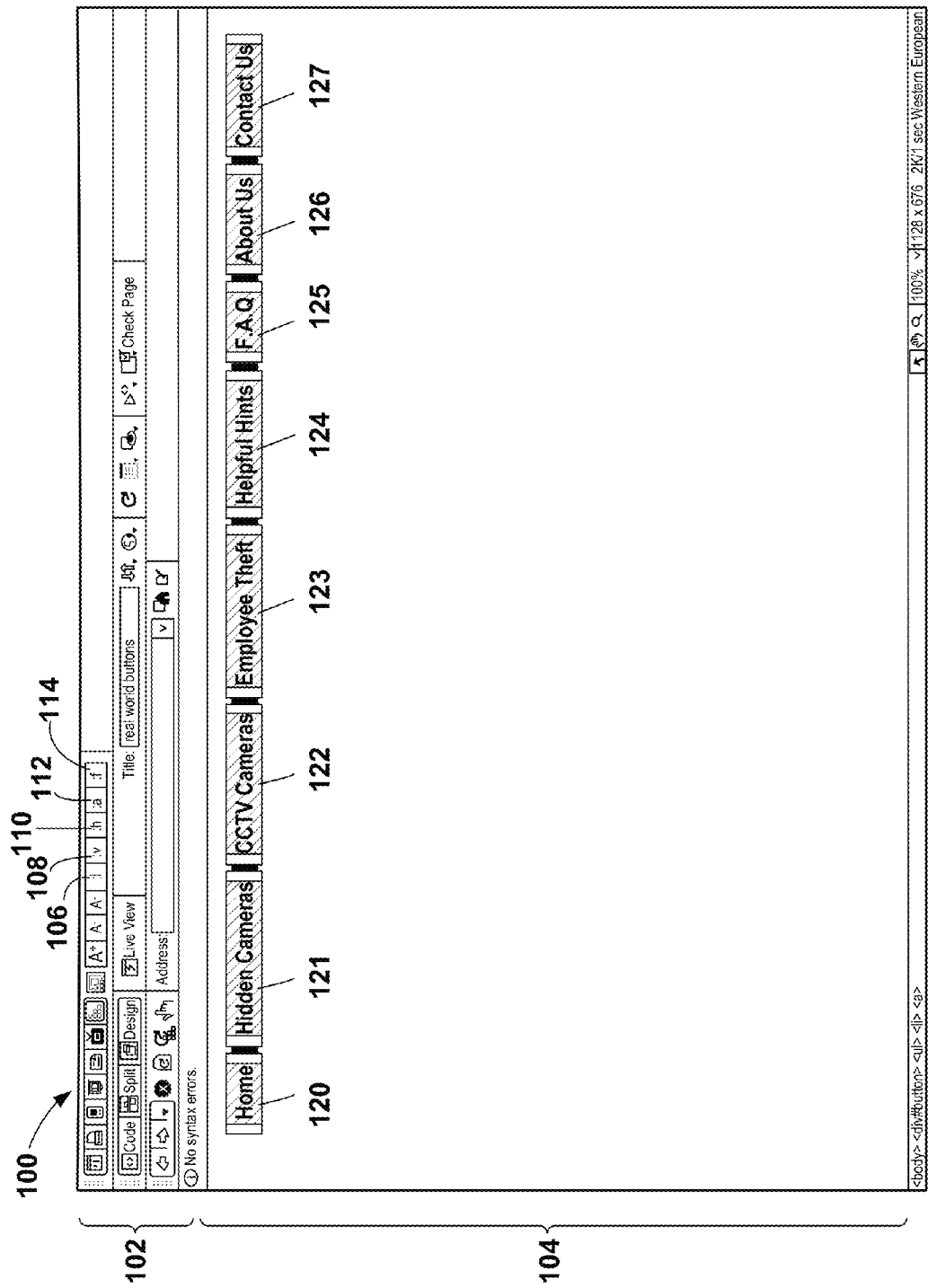
FIG. 2 is a portion of a computer screen capture illustrating an exemplary user interface of a content creation application illustrating features of one embodiment.

FIG. 2 is a portion of a computer screen capture illustrating an exemplary user interface 100 of a content creation application with various features of one embodiment. The user interface 100 provides a display area 104 for displaying content that is being created. In this example, the display area 104 displays content that includes several links 120-127 that will be displayed and provide functionality in the electronic content that is being created. In this particular use of links, the links 120-127 are displayed in a horizontal fashion as a single bar of buttons.

The user interface 100 further provides various tools and features accessed through feature menus and icons 102. Several of these features facilitate state-specific link filtering. As examples, buttons 106, 108, 110, 112, 114 allow a content creator to change the displayed links 120-127 in the development area to have a particular state. The :l button 106 is for the "link" state, the :v button 108 is for the "visited" state, the :h button 110 is for the "hover" state, the :a button 112 is for the "active" state; and the :f button 114 is for the "focus" state.

In the example, shown in FIG. 2, the :h button 110 of the user interface 100 has been selected. Given this selection, the user interface 100 displays any links in the display area 104 in their respective hover states. In particular, links 120-127 are displayed in their hover states with a green background color and a white text font.

FIGS. 3A-C are portions of computer screen captures illustrating a different state-specific link attributes in the content creation application of FIG. 2. For example, if the :l button 106 were selected rather than the :h button 110 in the user interface 100 of FIG. 2, then the links 120-127 in the display area 104 would be displayed in their respective link states as shown in FIG. 3A. In their link states, these links 120-127 each have a blue background and the respective link text 120A-127A have a white text font. Similarly, if the :a button 112 were selected in the user interface 100 of FIG. 2, then the links 120-127 in the display area 104 would be displayed in their respective active states as shown in FIG. 3B. In their active states, these links 120-127 each have a blue background and a gray text font. As another example, if the :f button 114 were selected in the user interface 100 of FIG. 2, then the links 120-127 in the display area 104 would be displayed in their respective focus states as shown in FIG. 3C. In their focus states, these links 120-127 each have a gray background and a dark gray text font. State appearances obviously can differ from these exemplary appearance attributes provided for exemplary purposes here.

The user interface 100 of FIG. 2 may provide buttons 106, 108, 110, 112, 114 as mutually exclusive options, allowing a user to limit the user interface to only one link state at a time. This is appropriate in cases where link states are mutually exclusive, e.g., a link cannot be both in the link state and the active state simultaneously. It may also be appropriate even where link states are not mutually exclusive, e.g., a link can be in the hover and focus states simultaneously. For example, restricting such use can simplify development and avoid confusion.

Figure 4A:
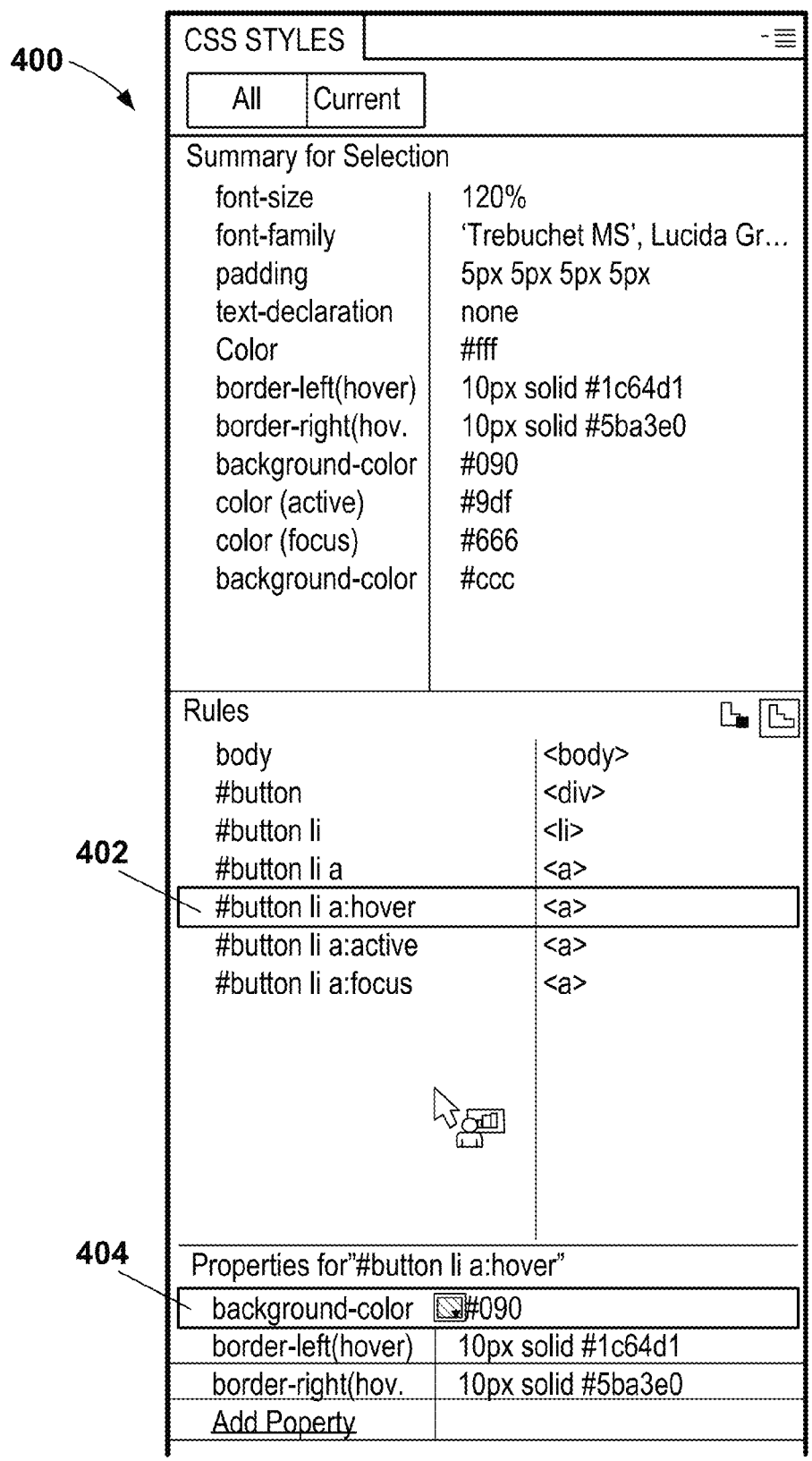
FIGS. 4A-B are portions of computer screen captures illustrating changing state-specific link attributes using an exemplary feature of the interface of the content creation application of FIG. 2.
Figure 4B:
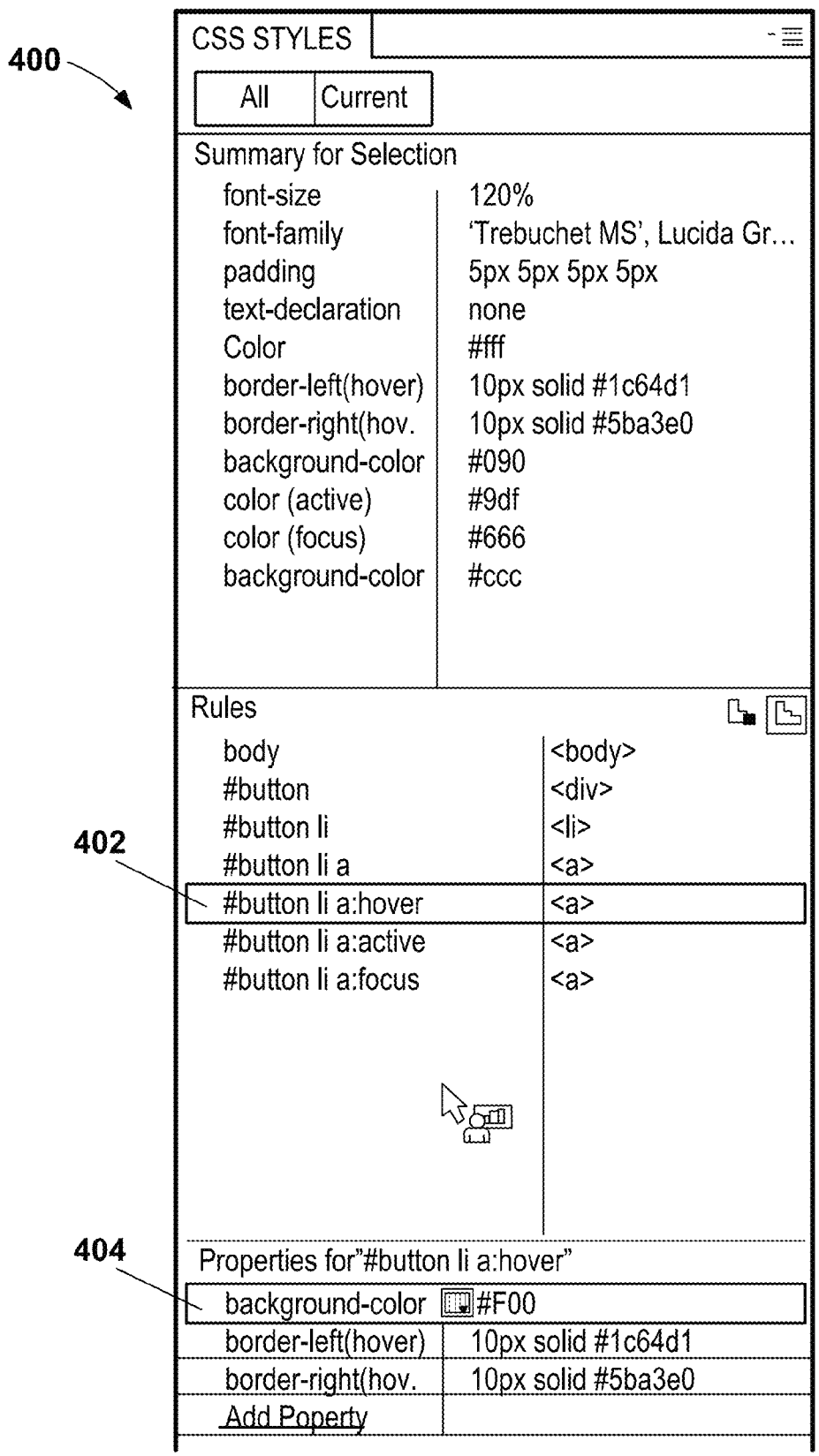

FIGS. 4A-B are portions of screen computer screen captures illustrating changing state-specific link attributes using an exemplary feature of the user interface 100 of the content creation application of FIG. 2. In this example, the user interface 100 presents the CSS Styles Panel 400 shown in FIG. 4. This CSS Styles Panel 400 shows the rules that apply to the current selected element. For example, if a content creator has selected one of the links 120-127 shown in FIG. 2 and the :h button 110 is selected, the CSS Styles Panel 400 may appear as illustrated in FIG. 4. A user can interact with the CSS Styles Panel 400 to change the appearance of the various link states. For example, a content creator can select the "#button li a:hover" rule 402 to specify the appearance elements that satisfy that rule, i.e., button elements within a list item in the "hover" state. The corresponding properties are shown at the button of the CSS Styles Panel 400. As one example, a content creator may change the background color setting 404 for the "#button li a:hover" rule 402 from #90 (which is green) to #F00 (which is red). Such a change is illustrated in the changed value of background color setting 404 shown in FIG. 4B. Such a color change, in this example, may be made by a content creator interacting with the CSS Styles Panel 400 directly or indirectly by, as example, the content creator interacting with a color picker dialog box and/or through interaction on the display area 104 of FIG. 2. It should be noted that CSS Rules can be configured to apply to less than all of the links used in content being developed. For example, a rule could be established that applies to only one of many button links that are displayed.

A content creation application could provide additional or alternative features for displaying and editing state-specific link attributes. In one embodiment, for example, a user interface may allow a user to identify particular items in a display area and then chose to view only those selected items in a selected state.

Embodiments disclosed herein can provide one or more significant improvements to existing content creation technologies as described in the examples above. In addition, it should be noted that one advantage of certain embodiments is enhancing a user interface's ability to show state-specific link display characteristics in the context in which they are used. For example, a content creator can see how the hover state of the content's links will appear in their actual locations in the content being developed because such links can be displayed in that state in the display area of a content creation application. In addition, links can be displayed in that context and allow visualization of significant display characteristics including color, size, font, dimensions, effects, etc., without be adjusted or scaled down to fit a restricted screen area. In some embodiments, links can be displayed in ways that show how styles apply to the exact semantic contexts in which they are used.

Figure 5:
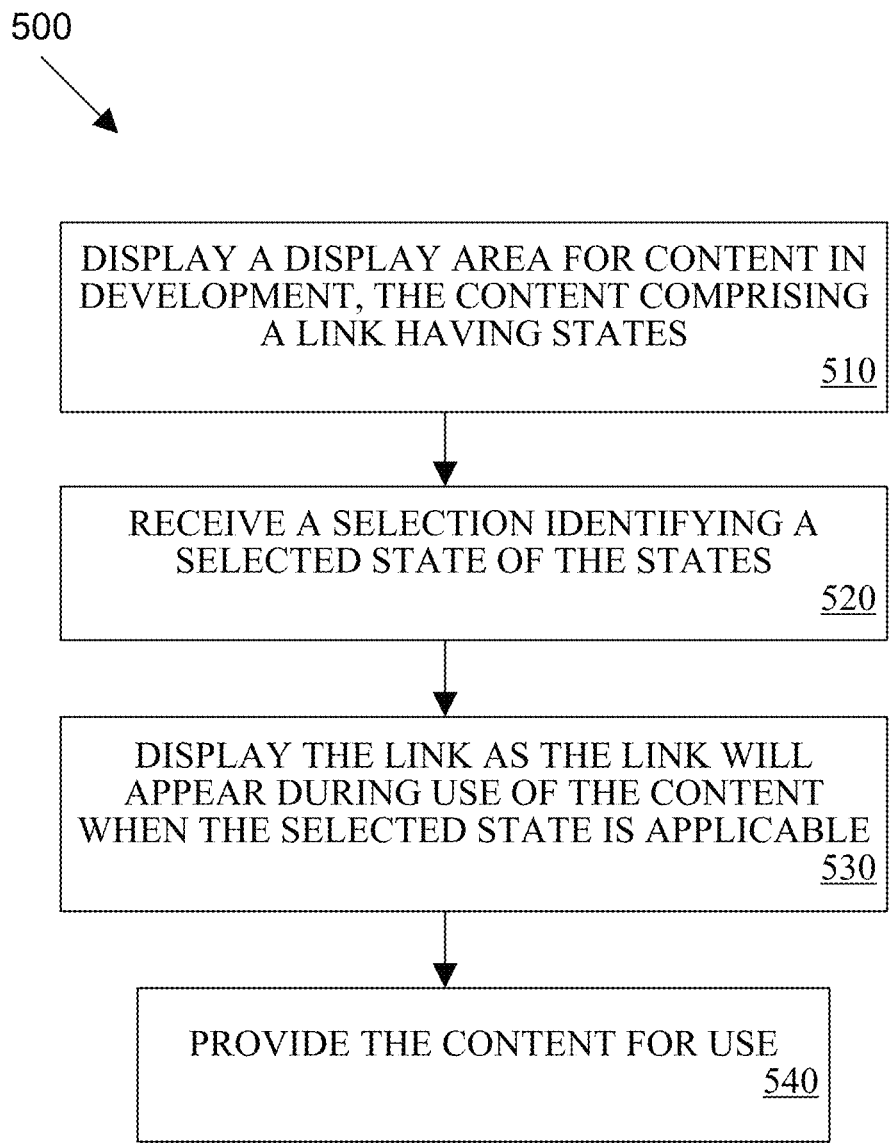
FIG. 5 is a flow chart of method for providing a content creation application that displays and allows editing of different link states according to one embodiment.

FIG. 5 is a flow chart of method 500 for providing a content creation application that displays and allows editing of different link states according to one embodiment. Such a content creation application may be provided on a variety of computing devices and in a variety of computing environments. For examples, the creation application 40 of FIG. 1 could be used as the content creation application providing design and development features 41 and canvas/display area 42 to facilitate content development. Another example involves a mobile computing device that provides an interface for developing content. Another example involves a software application that is provided as a service through a network, where the features and functionality of the application are provided to one or more remote devices that facilitate use of those features, for example, through interactions on a web browser.

The method 500 provides a content creation application that displays and allows editing of different link states. The method 500 involves displaying a display area for content that is in development, the content comprising at least one link having states, as shown in block 510. For example, the content may include several text links and several buttons that, during use, provide various link functions. Generally, the links may have one or more different states such that, during use of the content, an appearance of a link depends at least in part on which of the states are applicable to it. Which of the states are applicable to the link is generally based at least in part on use of the content, e.g., a user having previously used a link, a user hovering over a link, etc.

The method 500 further comprises receiving, in the content creation application, a selection identifying a selected state of the states, as illustrated in block 520. This may involve receiving input from a content creator selecting such a state. For example, a content creator may access a button such as one of the buttons 106, 108, 110, 112, 114 shown in FIG. 2 to select a state. Alternatively, a content creator may select a state from a drop down menu or any other user interface feature. As yet another alternative, the selected state may have been selected by a content creator during a configuration, settings, or preferences process.

The method 500 further comprises displaying the link as the link will appear during use of the content when the selected state is applicable, as shown in block 530. For example, if the link is associated with a hover state that is defined to have a bold border, then the link will appear in the content creation application with such a bold border when hover is a selected state. As another example, if both hover and focus are selected states then the link will appear with the appearance attributes of both of those states in the content creation application.

The method 500 further comprises providing the content for use, as shown in block 540. For example, the content may be provided for use by publishing the content or saving it to a location accessible for such use. The use of the content can be any use outside of the content creation application in which the content is being used rather than being edited or otherwise created.

In certain embodiments, the exemplary method 500 further facilitates editing state-specific attributes applicable to one or more links. This may involve providing one or more techniques that facilitate editing CSS attributes. In one embodiment, editing state-specific attributes involves receiving, in the content creation application, input changing an attribute of a definition, the definition defining, at least in part, the appearance of one or more of the links when the selected state is applicable to each of the links. Such input, as examples, may be received in a CSS Style Panel provided by the content creation application, as input received in the display area, or as input received in any other suitable manner. The received input may be used to modify the content that is displayed in the content creation application. For example, based on the input, the link displayed in the display area will appear as it will during use of the content when the selected state is applicable and thus based, at least in part, on the attribute of the definition that was changed.

In one exemplary embodiment, the method 500 further involves displaying and editing multiple links based on the selection of the selected link. For example, this may involve displaying multiple links in the content, each of the multiple links appearing as it will appear during use of the content when the selected state is applicable. Similarly, all links may be displayed in the selected state or, alternatively, only certain selected links will appear in the selected state. Generally, the ability to view and edit multiple links simultaneously can provide various benefits in content creation by, as examples, facilitating the consistent appearance and use of states and links, enhancing the content creator's ability to visualize state-specific appearance attribute and attribute changes, and/or facilitating testing of content.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   providing a content creation application on a computer apparatus, the computer apparatus comprising the content creation application as instructions embodied in a computer-readable medium which configure the computer apparatus to display a display area for content in development and a menu area to edit the content in development using editing features of the content creation application, wherein:
   the display area and the menu area are displayed in a same window,
   the editing features of the content creation application comprise a plurality of link filter options displayable in the menu area as a plurality of selectable icons, and
   each of the plurality of link filter options is associated with a different state from a plurality of states of a link;
   displaying, in the display area, the content in development, wherein the content in development comprises a plurality of links each having the plurality of states;
   displaying, in the menu area, the plurality of link filter options as the plurality of selectable icons;
   receiving, in the menu area, a selection of an icon of the plurality of selectable icons and corresponding to a link filter option of the plurality of link filter options, wherein the selection identifies a selected state of the plurality of states and causes the plurality of links to be previewed in the display area according to the selected state and an indication that the icon is selected to be displayed in the menu area; and
   based on receiving the selection of the icon, displaying each of the plurality of links in the selected state in the display area and the indication that the icon is selected in the menu area.

2. The method of claim 1 further comprising receiving, in the content creation application, input changing an attribute of a definition, the definition defining, at least in part, appearance of the plurality of links when the selected state is applicable to each of the links.

3. The method of claim 2 wherein a CSS style comprises the definition.

4. The method of claim 2 wherein the input is received in a CSS Style Panel provided by the content creation application.

5. The method of claim 2 wherein the input is received in the display area.

6. The method of claim 2 further comprising displaying the plurality of links in the display area of the content creation application, wherein each of the plurality of links is displayed as the links will appear during use of the content when the selected state is applicable and based, at least in part, on the attribute of the definition that was changed.

7. The method of claim 1 further comprising displaying all links of the content, wherein each link appears in the display area of the content creation application as each link will appear during use of the content when the selected state is applicable.

8. The method of claim 1 further comprising displaying selected links of the content, wherein each of the selected links appears in the display area of the content creation application as each of the selected links will appear during use of the content when the selected state is applicable.

9. The method of claim 1 wherein the states of the plurality of links comprise a visited state.

10. The method of claim 9 wherein the states of the plurality of links further comprise a link state, a hover state, an active state, and a focus state.

11. The method of claim 1, wherein the instructions further configure the computer apparatus to allow a selection of a set of links from the plurality of links, wherein a selection of a second icon from the plurality of selectable icons causes an update to the set of links in the display area, the update comprising displaying the set of links according to a second state corresponding to the second icon.

12. A computer apparatus comprising:
    a memory configured to store computer-executable instructions; and
    a processor configured to access the memory and execute the computer-executable instructions to collectively at least:
    provide a content creation application displaying a display area for content in development and a menu area to edit the content in development using editing features of the content creation application, wherein:
    the display area and the menu area are displayed in a same window,
    the editing features of the content creation application comprise a plurality of link filter options displayable in the menu area as a plurality of selectable icons, and
    each of the plurality of link filter options is associated with a different state from a plurality of states of a link;
    display, in the display area, the content in development, wherein the content in development comprises a plurality of links each having the plurality of states;
    receive a selection of an icon of the plurality of selectable icons and corresponding to a link filter option of the plurality of link filter options, wherein the selection identifies a selected state of the plurality of states and causes the plurality of links to be previewed in the display area according to the selected state and an indication that the icon is selected to be displayed in the menu area; and based on receiving the selection icon, display each of the plurality of links in the selected state in the display area.

13. The apparatus of claim 12 wherein the content creation application receives input changing an attribute of a definition, the definition defining, at least in part, appearance of the plurality of links when the selected state is applicable to each of the links.

14. The apparatus of claim 13 wherein the input is received in the display area of the content creation application.

15. The apparatus of claim 13 wherein the content creation application displays the plurality of links as the links will appear during use of the content when the selected state is applicable and based, at least in part, on the attribute of the definition that was changed.

16. The apparatus of claim 12 wherein the computer-executable instructions, when executed by the processor, further cause the processor to display all links of the content, wherein each link appears as each link will appear during use of the content when the selected state is applicable.

17. The apparatus of claim 12 wherein the computer-executable instructions, when executed by the processor, further cause the processor to display selected links of the content, wherein each of the selected links appears as each of the selected links will appear during use of the content when the selected state is applicable.

18. A non-transitory computer-readable storage medium storing computer-executable instructions that, when executed by a computer apparatus, configure the computer apparatus to perform operations comprising:

providing a content creation application configured to display a display area for content in development and a menu area to edit the content in development using editing features of the content creation application, wherein:
the display area and the menu area are displayed in a same window,
the editing features of the content creation application comprise a plurality of link filter options displayable in the menu area as a plurality of selectable icons, and
each of the plurality of link filter options is associated with a different state from a plurality of states of a link;

displaying, in the display area, the content in development, wherein the content in development comprises a plurality of links each having the plurality of states;

displaying, in the menu area, the plurality of link filter options as the plurality of selectable icons;

receiving, in the menu area, a selection of an icon of the plurality of selectable icons and corresponding to a link filter option of the plurality of link filter options, wherein the selection identifies a selected state of the plurality of states and causes the plurality of links to be previewed in the display area according to the selected state and an indication that the icon is selected to be displayed in the menu area; and based on receiving the selection of the icon, displaying each of the plurality of links in the selected state in the display area and the indication that the icon is selected in the menu area.

19. The non-transitory computer-readable storage medium of claim 18 wherein the computer-executable instructions, when executed by a computer apparatus, further configure the computer apparatus to perform operations comprising: receiving, in the content creation application, input changing an attribute of a definition, the definition defining, at least in part, appearance of the plurality of links when the selected state is applicable to each of the links.

20. The non-transitory computer-readable storage medium of claim 18 wherein the computer-executable instructions, when executed by a computer apparatus, further configure the computer apparatus to perform operations comprising: displaying the plurality of links in the display area of the content creation application, wherein the each of the plurality of links is displayed as the link will appear during use of the content when the selected state is applicable and based, at least in part, on the attribute of the definition that was changed.

21. The non-transitory computer-readable storage medium of claim 18 wherein the computer-executable instructions, when executed by a computer apparatus, further configure the computer apparatus to perform operations comprising: displaying all links of the content, wherein each link appears in the display area of the content creation application as each link will appear during use of the content when the selected state is applicable.

22. The non-transitory computer-readable storage medium of claim 18 wherein the computer-executable instructions, when executed by a computer apparatus, further configure the computer apparatus to perform operations comprising: displaying selected links of the content, wherein each of the selected links appears in the display area of the content creation application as each of the selected links will appear during use of the content when the selected state is applicable.

* * * * *

UNITED STATES PATENT AND TRADEMARK OFFICE
CERTIFICATE OF CORRECTION

PATENT NO. : 9,021,346 B2  Page 1 of 1
APPLICATION NO. : 12/634348
DATED : April 28, 2015
INVENTOR(S) : Randall Edmunds It is certified that error appears in the above-identified patent and that said Letters Patent is hereby corrected as shown below:

In the Claims

Column 11, Claim 12, Line 6

Insert --and the indication that the icon is selected in the menu area--

Signed and Sealed this
Eighth Day of September, 2015

Michelle K. Lee
*Director of the United States Patent and Trademark Office*